United States Patent Office 3,425,990
Patented Feb. 4, 1969

3,425,990
PROCESS FOR THE CHLOROMETHYLATION AND CROSSLINKING OF AROMATIC COMPOUNDS OF HIGH MOLECULAR WEIGHT
Herbert Corte, Opladen, Otto Netz, Cologne-Ehrenfeld, and Harold Heller, Leichlingen, Germany, assignors to Farbenfabriken Bayer Aktiengesellschaft, Leverkusen, Germany, a corporation of Germany
No Drawing. Filed Nov. 16, 1965, Ser. No. 508,153
Claims priority, application Germany, Dec. 16, 1964, F 44,729/64
U.S. Cl. 260—67.6     11 Claims
Int. Cl. C08f 7/02, 45/46

ABSTRACT OF THE DISCLOSURE

A process for chloromethylating and crosslinking high molecular weight aromatic compounds by contacting with methylal, chlorosulphonic acid and sulfuryl chloride reactants at a molar ratio of 2:.05–1:2–.5.

---

Object of the present invention is a process for the chloromethylation and crosslinking of aromatic compounds of high molecular weight wherein a reaction mixture of methylal, chlorosulphonic acid and sulphuryl chloride is used as the chloromethylation agent.

In this process the use of Friedel-Crafts catalysts is avoided and the degree of crosslinking can be varied by changing the composition of the chloromethylation mixtures.

The process according to the invention can be carried out in various ways.

(1) It is possible to dissolve or swell the aromatic compound of high molecular weight first in the reaction mixture of methylal and sulphuryl chloride, and then to add chlorosulphonic acid or the reaction mixture of methylal and chlorosulphonic acid; chloromethylation and crosslinking take place on the dissolved or swelled material.

(2) It is possible to add the aromatic compound of high molecular weight first to the reaction mixture of methylal and chlorosulphonic acid, effecting chloromethylation and crosslinking without initial swelling. Thereafter, the reaction mixture of methylal and sulphuryl chloride is added to effect chloromethylation.

(3) It is possible to add the aromatic compound of high molecular weight to a reaction mixture of methylal, sulphuryl chloride and chlorosulphonic acid. In this case, chloromethylation and crosslinking occur simultaneously with swelling.

By all these three possible variations, which all effect the conversion of the polymer with a reaction mixture of methylal, chlorosulphonic acid and sulphuryl chloride and only differ by the sequence in which the components are combined, the degree of chloromethylation and crosslinking can be influenced.

Another possible variation is obtained by varying the composition of the reaction mixture consisting of methylal, chlorosulphonic acid and sulphuryl chloride. Introducing of more chlorosulphonic acid always results in a higher degree of crosslinking, and introducing of more sulphuryl chloride results in a smaller degree of crosslinking and in an increased amount of chloromethyl groups introduced.

The aromatic compounds of high molecular weight which are used for carrying out the process according to the invention are known per se. Particularly suitable for this purpose are polymers and copolymers based on aromatic vinyl compounds, such as styrene, vinyltoluene and vinylnaphthalene, as well as copolymers of aromatic monovinyl compounds with other monoolefinically unsaturated compounds, such as ethylene and propylene, or compounds with conjugated carbon-carbon double bonds, such as butadiene and chloroprene.

Suitable as crosslinked aromatic compounds of high molecular weight are copolymers of the aforementioned aromatic monovinyl compounds or mixtures of these aromatic monovinyl compounds with the indicated other copolymerisation components and therewith copolymerisable crosslinking agents.

To be considered as crosslinking agents are aromatic or aliphatic compounds with several isolated carbon-carbon double bonds, such as divinylbenzene, substituted divinylbenzenes, diisopropenylbenzene, diisopropenylbiphenyl, trivinylbenzene, divinylketone, divinyl-Schiff's bases (see Makromolekulare Chemie 31 (1950), triacryloylhexahydrotriazine and esters of polyhydric alcohols and olefinically unsaturated carboxylic acids, such as ethylene glycol dimethacrylate. The crosslinking agents can be used in quantities of 0.1 to 50 and advantageously 0.1 to 20 mole percent, based on the total monomers. The copolymers can have a gel structure or even a sponge structure. Such copolymers are for example described in German patent specifications Nos. 829,223, 841,796 and 848,257 and in U.S.A. patent specifications Nos. 2,597,-439 and 2,597,440 and also in German Auslegeschrift No. 1,045,102.

In order to prepare the reaction mixture from methylal and sulphuryl chloride, from 1 to 3 mols of methylal are used to 1 mol of sulphuryl chloride. The conversion methylal to 1 mol of sulphuryl chloride. The conversion of the said components is generally effected at temperatures between $+50$ and $-10°$ C. and advantageously between $+10$ and $+30°$ C. It is either possible initially to provide the methylal and then gradually to add the sulphuryl chloride, or the sulphuryl chloride can be supplied initially and the methylal added while cooling. In one particularly advantageous method of production sulphuryl chloride and methylal are continuously mixed by means of proportioning devices in the required ratio, and while cooling.

If the aromatic compound of high molecular weight is to be introduced into a reaction mixture of methylal, sulphuryl chloride and chlorosulphonic acid for the chloromethylation, this reaction mixture is preferably produced by introducing successively chlorosulphonic acid and sulphuryl chloride, or vice versa, into the cooled methylal at temperatures which are below $+50°$ C. and advantageously between $+10$ and $+30°$ C., or even methylal, chlorosulphonic acid and sulphuryl chloride are continuously mixed by means of proportioning devices while cooling and stirring in the required ratio. This ratio can be varied within wide limits. Thus, it is readily possible to use 0.05 to 1 mol of chlorosulphonic acid and 2 to 0.5 mol of sulphuryl chloride to 2 mols of methylal. However, it is advantageous to use 0.1 to 1.0 mol of chlorosulphonic acid and 1.75 to 0.5 mol of sulphuryl chloride to 2 mols of methylal.

If solvents are used for the further reactions, these can be employed during the preparation of the reaction mixture or mixtures for diluting the methylal, the chlorosulphonic acid, the sulphuryl chloride or all three reactants.

The reaction mixture comprising methylal, sulphuryl chloride and chlorosulphonic acid represents a colourless to light-brown homogeneous liquid, depending upon the molar ratio, reaction temperature and degree of purity of the starting materials, and this liquid is miscible with inert organic solvents, such as chlorinated aliphatic hydrocarbons, e.g. carbon tetrachloride, ethylene chloride and 1,2-dichloropropane. These solvents may be used as the swelling agents as well.

The action of the chloromethylation agent on the aromatic compounds of high molecular weight advantageously takes place at temperatures from +20 to +70° C.

The said polymers and copolymers are generally introduced in the form of bead polymers. If it is desired, when using uncrosslinked bead polymers, to maintain the bead form when carrying out the process according to the invention, it is advisable to add the uncrosslinked bead polymers to the previously formed reaction mixture consisting of approximately equimolar quantities of methylal and chlorosulphonic acid, i.e. to proceed in accordance with the second method indicated above. If the process according to the invention is used for the chloromethylation of crosslinked, insoluble, aromatic compounds of high molecular weight, the degree of crosslinking is in each case raised by the process according to the invention, provided that the original crosslinking is stable under the reaction conditions. If this is not the case, as with crosslinking reactions by way of ester groups, the new crosslinking according to the invention takes the place of the original crosslinking.

In a modification of the process, it is also possible to swell the crosslinked compounds in methylal, or methylal and a solvent, and then to add sulphuryl chloride and chlorosulphonic acid.

The degree of crosslinking caused by the process according to the invention is at its maximum when the reaction mixture acts in undiluted form on the aromatic compound of high molecular weight. Dilution of the reaction mixture with solvents and also dissolution of the aromatic compound reduce the degree of crosslinking. The same applies as regards the treatment of crosslinked compounds; in this case, a swelling with swelling agents likewise causes a smaller degree of subsequent crosslinking than when the unswelled compound is treated.

The chloromethylated and crosslinked resins obtained according to the invention can be transformed in known manner into ion exchange resins by treatment with amines, polyamines, aminocarboxylic acids, aminosulphonic acids or aminophosphonic acids, or by oxidation, optionally with addition of swelling agents.

In addition, moulded components, for example flexible tubes, pipes or films of aromatic polymers and copolymers, can be chloromethylated and made insoluble by the process of the invention. Ion exchange membranes can be obtained from films treated in this way by known methods. Suitable for this purpose are more especially copolymers of olefinically unsaturated aliphatic hydrocarbons and aromatic vinyl compounds.

Example 1

116.5 g. of chlorosulphonic acid were introduced into 76 g. of methylal while cooling and stirring at 15 to 20° C. and 208 g. of an uncrosslinked styrene bead polymer (trade name: Vestyron N) were incorporated into this mixture. Thereafter, while continuing the stirring, the batch had added thereto a mixture of 152 g. of methylal and 270 g. of sulphuryl chloride, which had been prepared by slowly introducing the sulphuryl chloride dropwise into the methylal while stirring and cooling at 15 to 20° C. The temperature in the reaction vessel was in the region of 31° C. and was thereafter raised over a period of 90 minutes to 60° C. and then kept for 15 hours. After cooling, the brown reaction liquid was suction filtered off and the polymer was first of all treated with ice and then several times with water, folowed by being filtered with suction. The chlorine content of a sample extracted with tetrahydrofuran and dried was 19.85%.

Example 2

116.5 g. of chlorosulphonic acid were introduced into 76 g. of methylal while cooling and stirring at 15 to 20° C. and thereafter 208 g. of an uncrosslinked styrene bead polymer (trade name: Vestyron N) were added. While continuing to stir the batch, the reaction mixture of 380 g. of methylal and 405 g. of sulphuryl chloride (prepared as described in Example 1) was quickly added, the mixture then being slowly heated to 60° C.

After 16 hours, the mixture was worked up, as indicated in Example 1. The chlormethylated resin contained 20.8% of chlorine.

Example 3

236 g. of a bead polymer of vinyl toluene were added while stirring to 82 g. of methylal (methanol content 7.3%) and 116.5 g. of chlorosulphonic acid, reacted according to Examples 1 and 2.

This reaction mixture was immediately mixed quickly with a mixture of 164 g. of methylal and 270 g. of sulphurylchloride, (the preparation of which is described in Example 1), while continuing the stirring. Only a slight rise in temperature was observed. The mixture was heated for 20 hours at 45° C. and, during this time, was maintained capable of satisfactory stirring during this period by adding a total of 300 ml. of ethylene chloride in portions. After completing the reaction, working up took place as described in Example 1. The chloromethylation product had a chlorine content of 17.9%.

Example 4

210 g. of a styrene bead polymer crosslinked with 3% of divinylbenzene were introduced while stirring at room temperature, into the reaction mixture of 240 g. of methylal (95%) and 270 g. of sulphuryl chloride, prepared as described in Example 1. After another 116.5 g. of chlorosulphonic acid had been added dropwise while stirring and cooling at 15 to 20° C., the mixture was heated for 20 hours at 45° C. After working up had been carried out as described in Example 1, the reaction product contained 17.9% of chlorine.

Example 5

58 g. of chlorosulphonic acid and 304 g. of sulphurylchloride were added dropwise to 228 g. of methylal while stirring and cooling at 15 to 20° C. 220 g. of a styrene bead polymer crosslinked with 5% of triacryloylhexahydrotriazine and 200 ml. of ethylene chloride were introduced into this reaction mixture at room temperature, whereupon the batch was stirred for 20 hours at 45° C. After separating out the resin (see Example 1), the chlorine content of a sample extracted with tetrahydrofuran and dried was 19.5%.

Example 6

240 g. of methylal (95%), 116.5 g. of chlorosulphonic acid and 270 g. of sulphuryl chloride, reacted as described in Example 5, were mixed at room temperature and while stirring with 225 g. of a bead polymer, which had been prepared by suspension polymerisation of styrene with 10% of diisopropenylbenzene. The batch was thereafter stirred for 20 hours at 45° C. and then worked up, as described in Example 1. The chloromethylated bead polymer contained 18.5% of chlorine.

Example 7

228 g.of methylal, 29 g. of chlorosulphonic acid and 320 g. of sulphurylchloride were reacted as described in Example 5 and diluted with 600 ml. of ethylene chloride. To this mixture, there were added at room temperature and while stirring, 210 g. of a bead polymer with a sponge structure, which had been prepared by suspension polymerisation of styrene with 2% of divinylbenzene in the presence of 80% of heptane (calculated on styrene and divinylbenzene). The batch was stirred for 20 hours at 45° C. and then worked up, as indicated in Example 1. The chlorine content of the reaction product was 18.2%.

We claim:

1. A process for chloromethylating and crosslinking a high molecular weight aromatic compound comprising contacting said compound with methylal, chlorosulphonic acid and sulfuryl chloride reactants, the respective molar ratio of the reactants being about 2:05–1:2–.5.

2. The process of claim 1 wherein said high molecular weight aromatic compound is polystyrene.

3. The process of claim 1 wherein said high molecular weight aromatic compound is polyvinyl toluene.

4. The process of claim 1 wherein said high molecular weight aromatic compound is a styrene-divinyl benzene copolymer.

5. The process of claim 1 wherein said high molecular weight aromatic compound is a styrene-triacryloyl hexahydrotriazine copolymer.

6. The process of claim 1 for chloromethylating and crosslinking high molecular weight aromatic compounds which comprises contacting said compounds with
(a) a reaction mixture of 1–3 mols of methylal and 1 mol of sulphuryl chloride, thereafter with
(b) a reaction mixture of about 1 mol of methylal and about 1 mol of chlorosulphonic acid, in the presence of an inert organic solvent.

7. The process of claim 6 wherein said inert organic solvent is a member selected from the group consisting of carbon tetrachloride, ethylene chloride and 1,2-dichloropropane.

8. A process of claim 1 for chloromethylating and crosslinking high molecular weight aromatic compounds which comprises contacting a crosslinked high molecular weight aromatic compound swelled in an organic swelling agent with a reaction mixture consisting essentially of methylal, chlorosulphonic acid and sulphuryl chloride.

9. The process of claim 8 wherein said swelling agent is ethylene chloride.

10. A process of claim 1 for chloromethylating and crosslinking high molecular weight aromatic compounds which comprises mixing a high molecular weight aromatic compound with a reaction mixture of methylal and sulphuryl chloride and thereafter adding a mixture of chlorosulphonic acid and methylal.

11. A process of claim 1 for chloromethylating and crosslinking high molecular weight aromatic compounds which comprises mixing a high molecular weight aromatic compound with a reaction mixture of methylal and chlorosulphonic acid to effect chloromethylation and crosslinking, and thereafter contacting the mixture with a mixture of methylal and sulphuryl chloride.

References Cited
UNITED STATES PATENTS

| | | | |
|---|---|---|---|
| 3,311,602 | 3/1967 | Raley | 260—93.5 |
| 3,297,648 | 1/1967 | Certe et al. | 260—93.5 |

JOSEPH L. SCHOFER, *Primary Examiner.*

D. DENENBERG, *Assistant Examiner.*

U.S. Cl. X.R.

260—73, 67, 79.3, 64, 2.1, 649, 651, 93.5, 85.1, 87.5